United States Patent
Choi et al.

(10) Patent No.: US 11,354,535 B2
(45) Date of Patent: Jun. 7, 2022

(54) DEVICE AND METHOD WITH SENSOR-SPECIFIC IMAGE RECOGNITION

(71) Applicant: Samsung Electronics Co., Ltd., Suwon-si (KR)

(72) Inventors: Jiho Choi, Seoul (KR); Solae Lee, Suwon-si (KR); Hana Lee, Suwon-si (KR); Youngjun Kwak, Seoul (KR); Byung In Yoo, Seoul (KR); Yong-Il Lee, Daejeon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 91 days.

(21) Appl. No.: 16/856,221

(22) Filed: Apr. 23, 2020

(65) Prior Publication Data
US 2021/0174138 A1 Jun. 10, 2021

(30) Foreign Application Priority Data

Dec. 6, 2019 (KR) .......................... 10-2019-0161553

(51) Int. Cl.
*G06K 9/62* (2022.01)
*G06N 3/08* (2006.01)
*G06V 10/25* (2022.01)
*G06V 20/80* (2022.01)

(52) U.S. Cl.
CPC ......... *G06K 9/6232* (2013.01); *G06K 9/6262* (2013.01); *G06N 3/08* (2013.01); *G06V 10/25* (2022.01); *G06V 20/80* (2022.01)

(58) Field of Classification Search
CPC ............. G06K 9/6232; G06K 9/00577; G06K 9/3233; G06K 9/6262; G06V 10/25; G06V 20/80; G06N 3/08
See application file for complete search history.

(56) References Cited

U.S. PATENT DOCUMENTS

| | | | |
|---|---|---|---|
| 6,757,444 B2 * | 6/2004 | Matsugu | H04N 19/503 358/538 |
| 9,547,908 B1 * | 1/2017 | Kim | G06T 5/20 |
| 9,836,643 B2 | 12/2017 | Saripalle et al. | |
| 11,010,906 B2 * | 5/2021 | Guerrero | G06T 7/254 |
| 2011/0050883 A1 * | 3/2011 | Ghose | G06K 9/54 348/113 |
| 2018/0276488 A1 | 9/2018 | Yoo et al. | |
| 2019/0026544 A1 | 1/2019 | Hua et al. | |
| 2019/0197331 A1 | 6/2019 | Kwak et al. | |

FOREIGN PATENT DOCUMENTS

| | | |
|---|---|---|
| KR | 10-2018-0080081 A | 7/2018 |
| KR | 10-1960844 B1 | 3/2019 |
| KR | 10-2016082 B1 | 8/2019 |
| WO | WO-2020182710 A1 * | 9/2020 ............ G16H 50/20 |

OTHER PUBLICATIONS

Extended European search Report dated Feb. 18, 2021 in counterpart EP Application No. 20196392.3 (7 pages in English).

* cited by examiner

Primary Examiner — Utpal D Shah
(74) Attorney, Agent, or Firm — NSIP Law

(57) ABSTRACT

A method with image recognition includes: extracting, using a feature extraction layer, feature data from an input image received by an image sensor; and outputting a recognition result of an object appearing in the input image, by applying a fixed mask and a variable mask to the extracted feature data, wherein the variable mask is adjusted in response to the extracted feature data.

29 Claims, 12 Drawing Sheets

DEVICE AND METHOD WITH SENSOR-SPECIFIC IMAGE RECOGNITION

CROSS-REFERENCE TO RELATED APPLICATIONS

This application claims the benefit under 35 USC § 119(a) of Korean Patent Application No. 10-2019-0161553 filed on Dec. 6, 2019 in the Korean Intellectual Property Office, the entire disclosure of which is incorporated herein by reference for all purposes.

BACKGROUND

1. Field

The following description relates to technology for recognizing an image.

2. Description of Related Art

Recently, research has been conducted to solve an issue of classifying an input pattern into a specific group, research on a method of applying efficient and accurate pattern recognition performed by people to a computer. One area of such research is an artificial neural network. To solve the issue of classifying an input pattern into a specific group, the neural network employs an algorithm that generates a mapping between the input pattern and output patterns. The capability of generating such a mapping is referred to as a learning capability of the artificial neural network. Also, the artificial neural network may have a generalization capability of generating a relatively accurate output even for an input pattern yet to be used for learning, based on a learning result.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a method with image recognition includes: extracting, using a feature extraction layer, feature data from an input image received by an image sensor; and outputting a recognition result of an object appearing in the input image, by applying a fixed mask and a variable mask to the extracted feature data, wherein the variable mask is adjusted in response to the extracted feature data.

The outputting of the recognition result may include: calculating first recognition data from the extracted feature data, by the applying of the fixed mask to the extracted feature data; calculating second recognition data from the extracted feature data, by the applying of the variable mask to the extracted feature data; and determining the recognition result based on the first recognition data and the second recognition data.

The calculating of the first recognition data may include: generating a generic feature map related to an object region of interest by the applying of the fixed mask to the extracted feature data; and calculating the first recognition data from the generic feature map.

The calculating of the second recognition data may include: generating a sensor-specific feature map related to a region of interest of the image sensor by the applying of the variable mask to a target feature map corresponding to the extracted feature data; and calculating the second recognition data from the sensor-specific feature map.

The generating of the sensor-specific feature map may include: applying a corresponding value in the variable mask for an individual value of the target feature map.

The may further include: calculating, from the extracted feature data, third recognition data using a softmax function and a fully connected layer. The determining of the recognition result may include: determining the recognition result further based on the third recognition data in addition to the first recognition data and the second recognition data.

The outputting of the recognition result may include: adjusting one or more values of the variable mask based on the extracted feature data, using at least a portion of a sensor-specific layer including the variable mask.

The adjusting of the one or more values of the variable mask may include: determining a value of the variable mask using a softmax function from a result of multiplication between a transposed query feature map and a key feature map corresponding to a result of applying convolutional filtering to the extracted feature data.

The outputting of the recognition result may include: determining, to be the recognition result, a weighted sum of first recognition data based on the fixed mask and second recognition data based on the variable mask.

The determining of the weighted sum to be the recognition result may include: applying, to the second recognition data, a weight greater than a weight applied to the first recognition data.

The method may further include: receiving, from an external server, in response to an update command, a parameter of a sensor-specific layer including the variable mask; and updating a sensor-specific layer with the received parameter.

The method may further include: requesting, from the external server, a sensor-specific parameter corresponding to an optical characteristic similar or identical to an optical characteristic of the image sensor.

The method may further include: maintaining a value of the fixed mask while a parameter of the sensor-specific layer is updated.

The outputting of the recognition result may include: calculating the recognition result based on the fixed mask and a plurality of variable masks.

A parameter of a sensor-specific layer including one variable mask among the plurality of variable masks may be different from a parameter of another sensor-specific layer including another variable mask among the plurality of variable masks.

The outputting of the recognition result may include: generating, as the recognition result, authenticity information indicating whether the object is a real object or a fake object.

The method may further include: granting an authority based on the recognition result; and allowing an access to either one or both of an operation of an electronic terminal and data of the electronic terminal, based on the authority.

The outputting of the recognition result may include: visualizing the recognition result on a display after the recognition result is generated.

In another general aspect, a non-transitory computer-readable storage medium may store instructions that, when executed by a processor, cause the processor to perform the method described above.

In another general aspect, a device with image recognition includes an image sensor and a processor. The image sensor is configured to receive an input image. The processor is configured to: extract feature data from the input image using a feature extraction layer; and output a recognition result of an object appearing in the input image, by applying a fixed mask and a variable mask to the extracted feature data, wherein the variable mask is adjusted in response to the extracted feature data.

The outputting of the recognition result may include: calculating first recognition data from the extracted feature data, by the applying of the fixed mask to the extracted feature data; calculating second recognition data from the extracted feature data, by the applying of the variable mask to the extracted feature data; and determining the recognition result based on a sum of the first recognition data and the second recognition data.

The sum may be determined by applying a weight to the second recognition data that is greater than a weight applied to the first recognition data.

The calculating of the first recognition data may include: generating a generic feature map related to an object region of interest by the applying of the fixed mask to the extracted feature data; and calculating the first recognition data from the generic feature map. The calculating of the second recognition data may include: generating a sensor-specific feature map related to a region of interest of the image sensor by the applying of the variable mask to a target feature map corresponding to the extracted feature data; and calculating the second recognition data from the sensor-specific feature map.

In another general aspect, a system with image recognition includes an image recognition device and a server. The image recognition device is configured to: extract feature data from a received input image using a feature extraction layer; and output a recognition result of an object appearing in the input image, by applying a fixed mask and a variable mask to the extracted feature data. The variable mask is included in a sensor-specific layer of the image recognition device, and is adjusted in response to the extracted feature data. The server is configured to distribute a parameter of an additionally trained sensor-specific layer to the image recognition device, in response to either one or both of an update request from the image recognition device and completion of additional training for a sensor-specific layer of a recognition model of the server. The image recognition device is configured to update the sensor-specific layer of the image recognition device based on the distributed parameter.

The server may be further configured to distribute the parameter of the additionally trained sensor-specific layer to another image recognition device including an image sensor determined to be similar to an image sensor of the image recognition device.

Other features and aspects will be apparent from the following detailed description, the drawings, and the claims.

Figure 1:
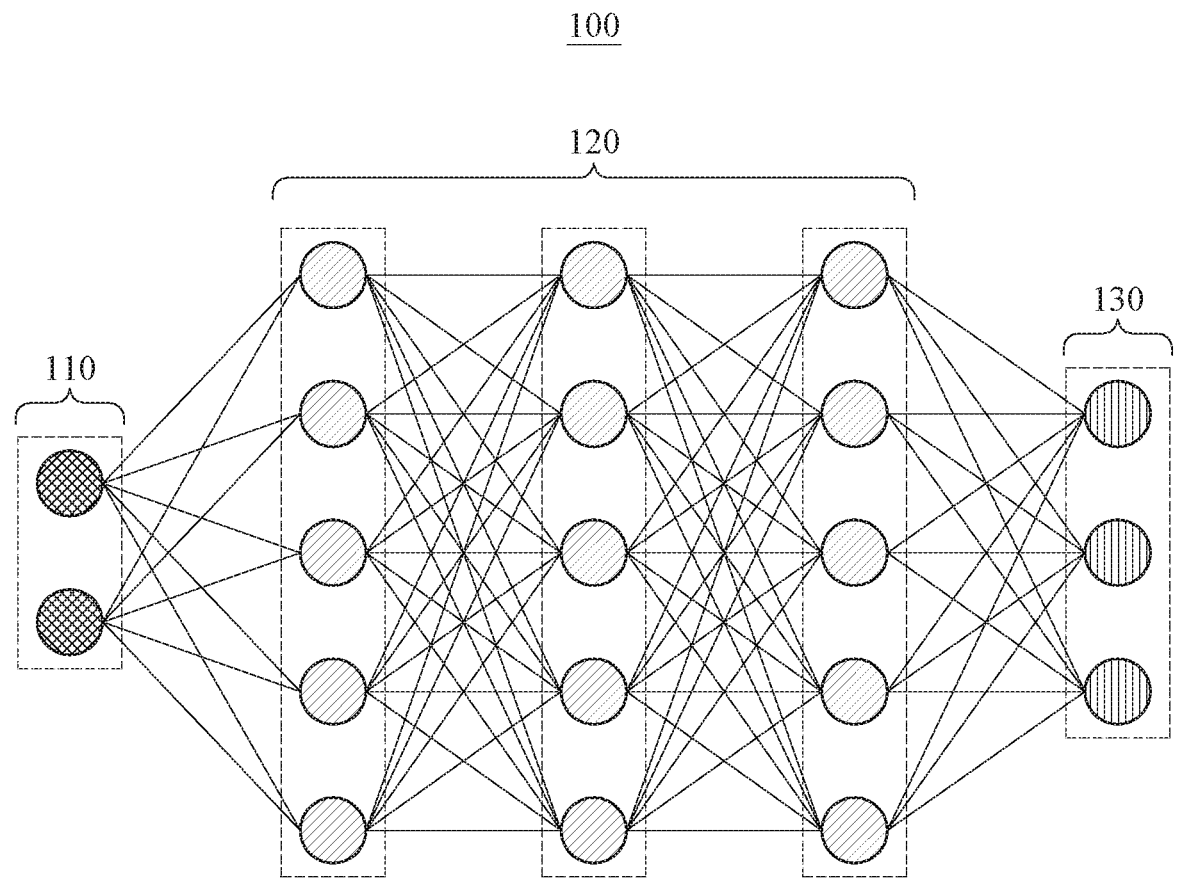
FIG. 1 illustrates an example of a recognition model.

Throughout the drawings and the detailed description, the same drawing reference numerals refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Herein, it is noted that use of the term "may" with respect to an example or embodiment, e.g., as to what an example or embodiment may include or implement, means that at least one example or embodiment exists in which such a feature is included or implemented while all examples and embodiments are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

The terminology used herein is for describing various examples only and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Unless otherwise defined, all terms, including technical and scientific terms, used herein have the same meaning as commonly understood by one of ordinary skill in the art to which this disclosure pertains, based on an understanding of this disclosure. Terms, such as those defined in commonly used dictionaries, are to be interpreted as having a meaning that is consistent with their meaning in the context of the relevant art, and are not to be interpreted in an idealized or overly formal sense unless expressly so defined herein.

The features of the examples described herein may be combined in various ways as will be apparent after an understanding of the disclosure of this application. Further, although the examples described herein have a variety of configurations, other configurations are possible as will be apparent after an understanding of the disclosure of this application.

FIG. 1 illustrates an example of a recognition model.

An image recognition device may recognize a user using feature data extracted from an input image. For example, the image recognition device may extract feature data from an input image based on at least a portion, for example, a feature extraction layer, of layers of a recognition model. The feature data is, for example, data in which an image is abstracted, and is represented in a form of a vector, for example. Feature data in a form of a two-dimensional vector or greater than two-dimensional vector is also referred to as "feature map." In this disclosure, the feature map refers to feature data in a form of a 2D vector or 2D matrix.

A recognition model is, for example, a model designed to extract feature data from an image and output a result of recognizing an object appearing in the image from the extracted feature data. The recognition model is, for example, a machine learning structure and includes a neural network 100.

The neural network 100 may be, for example, a deep neural network (DNN). The DNN may include a fully connected network, a deep convolutional network, a recurrent neural network, and the like. The neural network 100 may perform object classification, object recognition, speech recognition, and image recognition by mapping input data and output data having a nonlinear relationship based on deep learning. The deep learning is a machine learning technique for solving issues related to an image or speech recognition from big data sets, and is performed by mapping input data and output data through supervised or unsupervised learning.

Herein, recognition includes verification of data and identification of data. Verification may be an operation of determining whether input data is true or false. As an example, verification is an operation for determining whether an object (e.g., a face of a person) indicated by an input image is the same as an object indicated by a reference image. As another example, liveness verification may be an operation of determining whether an object indicated by an input image is a real object or a fake object.

The image recognition device may verify whether data extracted and acquired from an input image is the same as registered data in the image recognition device. When it is verified that the extracted data is the same as the registered data, the image recognition device may determine that the verification for a user corresponding to the input image is successful. When items of registered data are stored in the image recognition device, the image recognition device may perform the verification of the data extracted and acquired from the input image with respect to each item of the registered data in sequence.

Identification is a classification operation of determining a label indicated by input data among a plurality of labels. For example, each label indicates a class (e.g., identities (ID) of registered users). Through the identification, for example, it may be determined whether a user included in the input data is male or female.

Referring to FIG. 1, the neural network 100 includes, for example, an input layer 110, a hidden layer 120, and an output layer 130. The input layer 110, the hidden layer 120, and the output layer 130 each include a plurality of artificial nodes.

For ease of description, FIG. 1 illustrates that the hidden layer 120 includes three layers. However, the hidden layer 120 may include various numbers of layers. Further, FIG. 1 illustrates the neural network 100 including a separate input layer to receive input data. However, the input data may be input directly into the hidden layer 120. In the neural network 100, nodes of layers excluding the output layer 130 are connected to nodes of a subsequent layer through links to transmit output signals. The number of links corresponds to the number of nodes included in the subsequent layer.

An output of an activation function related to weighted inputs of artificial nodes included in a previous layer may be input into each artificial node of the hidden layer 120. The weighted inputs may be obtained by multiplying inputs of the artificial nodes included in the previous layer by a weight. The weight may be referred to as a parameter of the neural network 100. The activation function includes a sigmoid, a hyperbolic tangent (tan h), and a rectified linear unit (ReLU), and a non-linearity is formed in the neural network 100 by the activation function. The weighted inputs of the artificial nodes included in the previous layer may be input into the artificial nodes of the output layer 130.

Once input data is given, the neural network 100 may calculate a function value based on the number of classes to be identified in the output layer 130 through the hidden layer 120, and may identify a class having a greatest value among the classes as the input data. Although the neural network 100 identifies the input data, embodiments are not limited to such an example. The neural network 100 may verify input data with respect to reference data, for example, registered data. The following description of a recognition the process is mainly described as a verification process, but may be applied to an identification process as long as the recognition process is not contradictory to an identification process.

When the width and the depth of the neural network 100 are sufficiently great, the neural network 100 may have a capacity sufficient to implement a predetermined function. When the neural network 100 learns a sufficient quantity of training data through an appropriate training process, the neural network 100 may achieve an optimal estimation performance.

Although the neural network 100 has been described above as an example of a recognition model, the recognition model is not limited to the neural network 100. An example verification operation based on feature data extracted using a feature extraction layer of a recognition model will be primarily described below.

Figure 2:
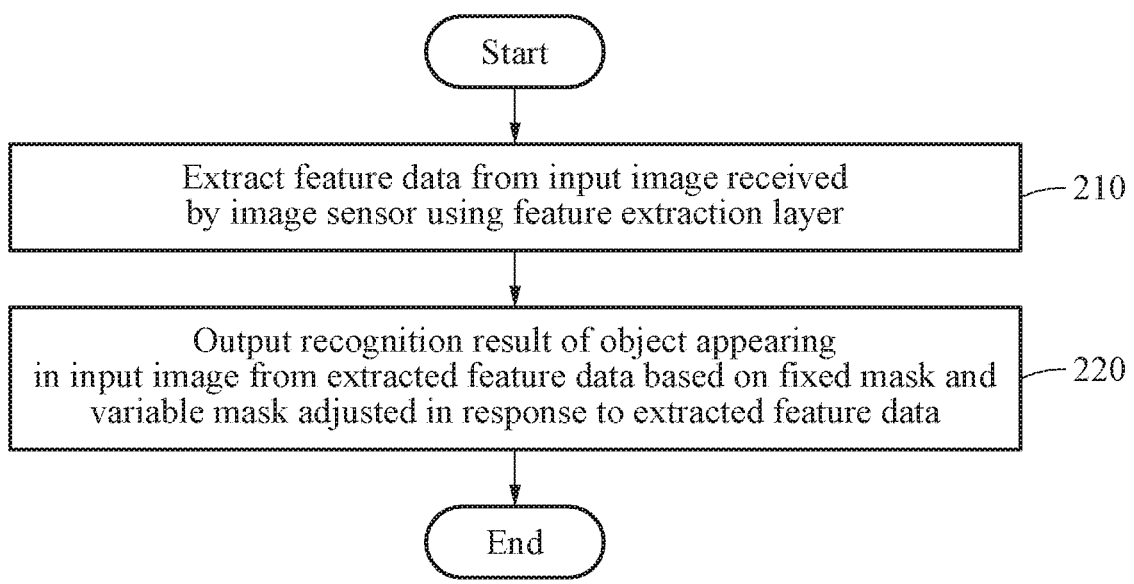
FIG. 2 is a flowchart illustrating an example of an image recognition method.

FIG. 2 is a flowchart illustrating an example of an image recognition method.

An image recognition device may receive an input image through an image sensor. The input image may be an image related to an object, for example, an image acquired by capturing at least a portion of the object. A portion of an object may be a body part related to a unique biometric feature of the object. In an example in which an object is a person, a portion of the object is, for example, a face, a fingerprint, a vein, and the like. This disclosure includes a description of an example in which an input image includes a face of a person, but not limited to such an example. An input image may be, for example, a color image, and may include a plurality of channel images for each channel constituting a color space. For example, in terms of an RGB color space, an input image includes a red channel image, a green channel image, and a blue channel image. The color space is not limited to the example and may include YCbCr or the like. The input image is not limited to the foregoing examples and may include a depth image, an infrared image, an ultrasonic image, a radar scan image, or the like.

In operation 210, the image recognition device extracts feature data from an input image received by an image sensor using a feature extraction layer. The feature extraction layer is, for example, the hidden layer 120 of FIG. 1 and may include one or more convolutional layers. An output of each convolutional layer is a result of applying a convolution operation, through sweeping of a kernel filter, to data input to the corresponding convolutional layer. In an example in which the input image includes a plurality of channel images, the image recognition device may extract feature data for each of the channel images using the feature extraction layer of the recognition model and may propagate the feature data to a subsequent layer of the recognition model.

In operation 220, the image recognition device outputs a recognition result of an object appearing in the input image from the feature data extracted in operation 210 based on a fixed mask and a variable mask adjusted in response to the extracted feature data. The fixed mask is a mask having the same value for different input images. The variable mask is a mask having different values for different input images.

A mask includes a mask weight for excluding, preserving, and changing values included in data. The mask may be applied to data including a plurality of values through an element-wise (e.g., element-by-element) operation. For example, for a value of the data, a corresponding mask weight in the mask is multiplied. As described below, the mask includes mask weights for emphasizing and/or preserving values corresponding to a region of interest in the data and deemphasizing and/or excluding values corresponding to a remaining region in the data. For example, the mask weight may have a value of a real number ranging between 0 and 1 but a value range of the mask weight is not limited to such an example. Data to which the mask is applied may also referred to as "masked data."

For reference, the following description is based on a case in which a size and a dimension of a mask are the same as a size and a dimension of data to which the mask is to be applied. For example, when data to which a mask is to be applied is a two-dimensional (2D) vector having a size of 32×32, the mask is a 2D vector having the size of 32×32. However, the foregoing description is merely an example, and the disclosure is not to be taken as being limited to such an example. A size and a dimension of a mask may be different from a size and a dimension of data.

The image recognition device may calculate items of masked data by applying a mask to the extracted feature data and target data extracted from the feature data. The image recognition device may calculate a recognition result using the items of masked data.

Figure 3:
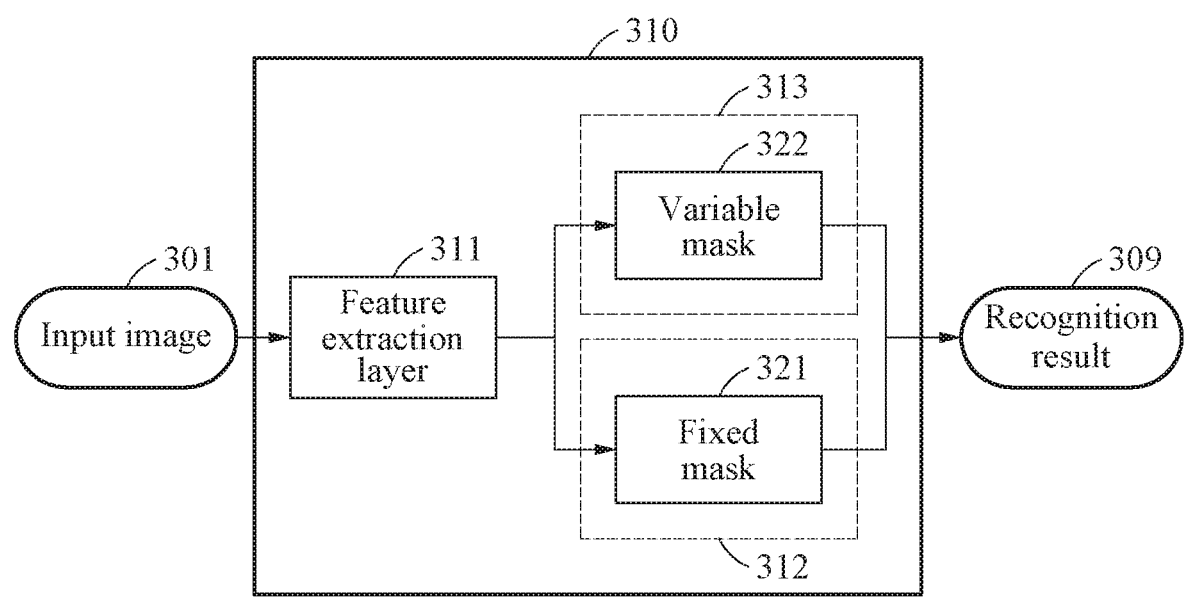
FIGS. 3 and 4 illustrate examples of a structure of a recognition model.
Figure 4:
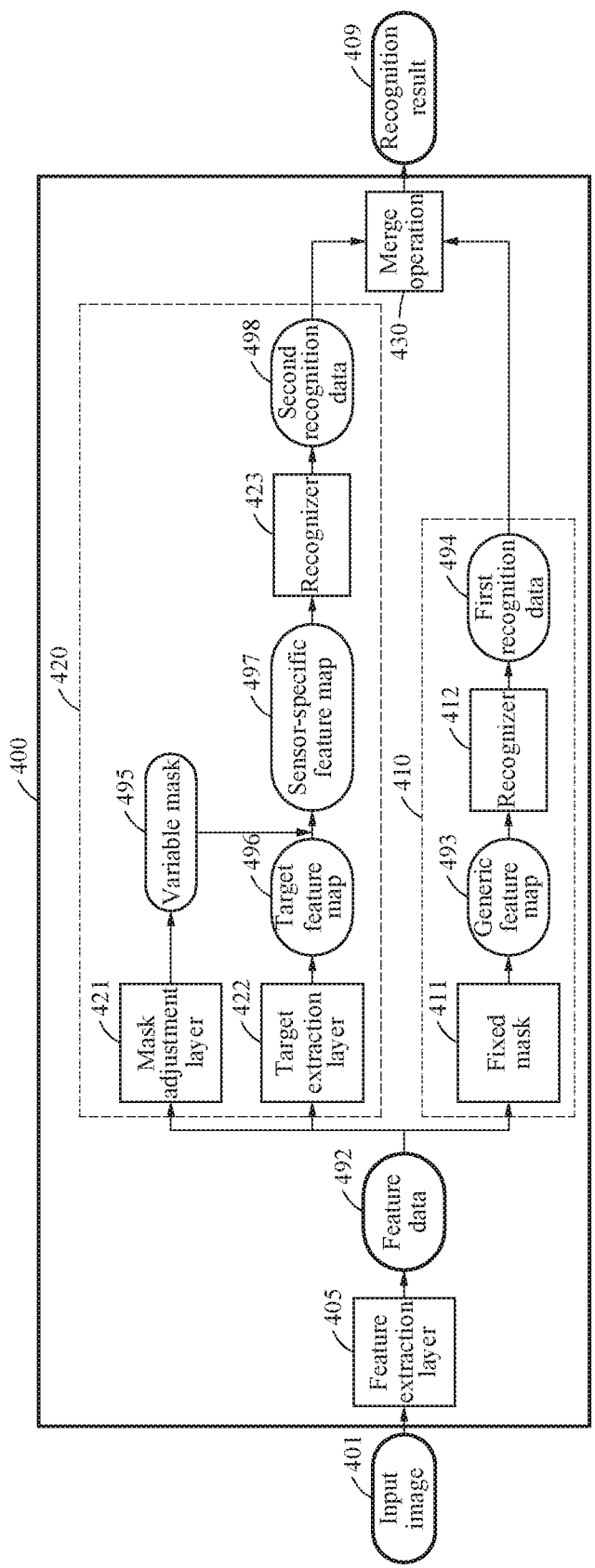

FIGS. 3 and 4 illustrate examples of a structure of a recognition model.

FIG. 3 illustrates an example of a structure of a recognition model 310. The image recognition device may output a recognition result 309 from an input image 301 using the recognition model 310. For example, the image recognition device outputs the recognition result 309 from a single image using the recognition model 310 when a pair of images are absent.

The recognition model 310 includes, for example, a feature extraction layer 311, a fixed layer 312, and a sensor-specific layer 313. The feature extraction layer 311 is a layer designed to extract feature data from the input image 301. The fixed layer 312 is a layer designed to apply a fixed mask 321 to data (e.g., feature data) propagated from the feature extraction layer 311 and output first recognition data from the data to which the fixed mask 321 is applied. The sensor-specific layer 313 is a layer configured to apply a variable mask 322 to data (e.g., a target feature map extracted from the feature data through one or more convolutional layers) propagated from the feature extraction layer 311 and output second recognition data from the data to which the variable mask 322 is applied.

The recognition model 310 may be customized based on a type of an image sensor of an electronic terminal in which the recognition model 310 is provided. For example, a parameter of the fixed layer 312 of the recognition model 310 may be invariant irrespective of a type of an image sensor. Also, a parameter (e.g., a connection weight between artificial nodes, etc.) of the sensor-specific layer 313 may vary based on a type of an image sensor. Types of image sensors are classified based on, for example, optical characteristics of the image sensors. If image sensors have identical or similar optical characteristics and different model numbers, the image sensors may be classified as the same type.

The image recognition device may extract feature data from the input image 301 through the feature extraction layer 311. As described above, the feature data is data in which a characteristic of an image is abstracted and may be data in a form of a vector (e.g., a feature vector) but not be limited thereto.

The image recognition device may calculate items of recognition data from the same feature data by using masks individually. As an example, the image recognition device calculates first recognition data from the extracted feature data based on a fixed mask. The first recognition data is a result calculated from data to which the fixed mask is applied, and may also be referred to as "generic recognition data." As another example, the image recognition device calculates second recognition data from the extracted feature data based on the variable mask 322. The second recognition data is a result calculated from data to which the variable mask 322 is applied, and may also be referred to as "sensor-specific data."

The image recognition device may determine the recognition result 309 based on the first recognition data and the second recognition data. Each of the first recognition data and the second recognition data may indicate at least one of a probability that an object appearing in the input image 301 is a real object and a probability that an object appearing in the input image 301 is a fake object. The probability that an object appearing in the input image 301 is a real object may have a value of a real number ranging between 0 and 1. The probability approaching 0 indicates that the object appearing in the input image is likely to be a fake object. The probability being close to 1 indicates that the object appearing in the input image is likely to be a real object. The image recognition device may determine the recognition result 309 by combining the first recognition data and the second recognition data. For example, the image recognition device calculates a weighted sum of the first recognition data and the second recognition data to be the recognition result 309.

FIG. 4 illustrates the structure of a recognition model 400, which corresponds to the recognition model 310 of FIG. 3, in greater detail.

An image recognition device may extract feature data 492 from an input image 401 using a feature extraction layer 405 of the recognition model 400, like the example of FIG. 3. An example of calculating first recognition data 494 with respect to the feature data 492 using a fixed layer 410 and an example of calculating second recognition data 498 using a sensor-specific layer 420 will be described below.

The image recognition device may generate a generic feature map 493 related to an object region of interest by applying a fixed mask 411 to the feature data 492. For example, the image recognition device applies a mask weight corresponding to a corresponding value in the fixed mask 411 for each value of the feature data 492 based on an element-wise operation. An object region of interest is a region of interest related to a portion of an object in data and may be, for example, a region including components related to a human face. In the fixed mask 411, a mask weight in the object region of interest may be greater than a mask weight of a remaining region. Thus, the generic feature map 493 is a feature map that emphasizes the components related to the human face in the feature data 492 and deemphasizes or excludes remaining components.

The image recognition device may calculate the first recognition data 494 from the generic feature map 493. For example, the image recognition device calculates the first recognition data 494 using a recognizer 412 of the fixed layer 410. The recognizer 412 is configured to output recognition data from the generic feature map 493. The recognizer is, for example, a classifier and outputs a first verification score vector (for example, the first verification score vector=[a probability of being a real object, a probability of being a fake object]) indicating a probability that an object appearing in the input image 401 is a real object and a probability that the object appearing in the input image 401 is a fake object. The classifier may include a fully connected layer (also referred to as "FC layer") and a softmax operation.

For reference, in this disclosure, a verification score is primarily described as an example of recognition data, but the disclosure is not limited to such an example. The recognition data may include information indicating a probability that an object appearing in an input image belongs to each of k classes, k being an integer greater than or equal to 2. Also, although a softmax operation is representatively described as an operation for calculating recognition data, this is merely an example and other non-linear mapping functions may also be applicable.

In addition, before applying a variable mask 495 to a target feature map 496, the image recognition device may adjust the variable mask 495 in response to the feature data 492 being propagated. For example, the image recognition device adjusts one or more values of the variable mask 495 based on the feature data 492 using at least a portion (e.g., a mask adjustment layer 421) of layers of the sensor-specific layer 420 including the variable mask 495. A mask weight of the variable mask 495 may be updated each time the input image 401 is input. The mask adjustment layer 421 may be implemented as, for example, a portion of an attention layer. A description related to the mask adjustment layer 421 will be made with reference to FIG. 7.

The image recognition device may generate a sensor-specific feature map 497 related to a region of interest of an image sensor by applying the adjusted variable mask 495 to the target feature map 496 corresponding to the feature data 492. For example, the image recognition device extracts the target feature map 496 from the feature data 492 using a target extraction layer 422. The target extraction layer 422 may include one or more convolutional layers. The target feature map 496 is, for example, a feature map obtained by applying one or more convolution operations to the feature data 492. The image recognition device generates the sensor-specific feature map 497 by applying a corresponding value in the variable mask 495 for an individual value of the target feature map 496. For example, the image recognition device applies a mask weight corresponding to the corresponding value in the variable mask 495 for each value of the target feature map 496 based on the element-wise operation.

In this disclosure, a region of interest of an image sensor refers to a region of interest related to a portion of an object and an optical characteristic of the image sensor in data. For example, the region of interest of the image sensor may be a region including a principal component for object recognition in consideration of the optical characteristic (e.g., lens shading, a sensitivity of the image sensor, etc.) of the image sensor in the data. As described above, since the mask weight of the variable mask 495 is adjusted for each input, the region of interest of the image sensor is changed for each input. The sensor-specific feature map is a feature map that emphasizes the region of interest related to the optical characteristic of the image sensor and the object in the target feature map. The optical characteristic of the image sensor may be applied to a parameter of the sensor-specific layer 420 determined through training, as described in greater detail with reference to FIGS. 9 and 10.

The image recognition device may calculate the second recognition data 498 from the sensor-specific feature map 497. For example, the image recognition device calculates the second recognition data 498 using a recognizer 423 of the sensor-specific layer 420. The recognizer 423 is designed to output recognition data from the sensor-specific feature map 497. The recognizer 423 is, for example, a classifier and outputs a second verification score vector (for example, the second verification score vector=[a probability of being a real object, a probability of being a fake object]) indicating a probability that the object appearing in the input image 401 is a real object and a probability that the object appearing in the input image 401 is a fake object. For reference, even if the recognizer 412 of the fixed layer 410 and the recognizer 423 of the sensor-specific layer 420 are in the same structure (e.g., a structure including a fully connected layer and a softmax operation), a parameter of the recognizer 412 may differ from a parameter of the recognizer 423.

The image recognition device may generate a recognition result 409 by applying a merge operation 430 to the first recognition data 494 and the second recognition data 498. For example, the image recognition device may determine a weighted sum of the first recognition data 494 based on the fixed mask and the second recognition data 498 based on the variable mask 495 to be the recognition result 409. The image recognition device may determine the recognition result as shown in Equation 1 below.

$$\text{Liveness Score} = \alpha \cdot \text{score}_1 + \beta \cdot \text{score}_2 \quad \text{[Equation 1]}$$

In Equation 1, Liveness Score is a liveness verification score corresponding to the recognition result 409. $score_1$ is a verification score of the first recognition data 494 and $score_2$ is a verification score of the second recognition data 498. α is a weight for the first recognition data 494 and β is a weight for the second recognition data 498. The image recognition device may apply a weight greater than the weight for the first recognition data 494 to the second recognition data 498. Accordingly, in Equation 1, β>α, for example. Equation 1 is merely an example. The image recognition device may calculate n items of recognition data based on a structure of a recognition model, and may calculate a weighted sum by applying n weights to each of the n items of recognition data. Among the n weights, a weight applied to recognition data based on a variable mask may be greater than weights applied to remaining items of the recognition data, n being an integer greater than or equal to 2.

Figure 5:
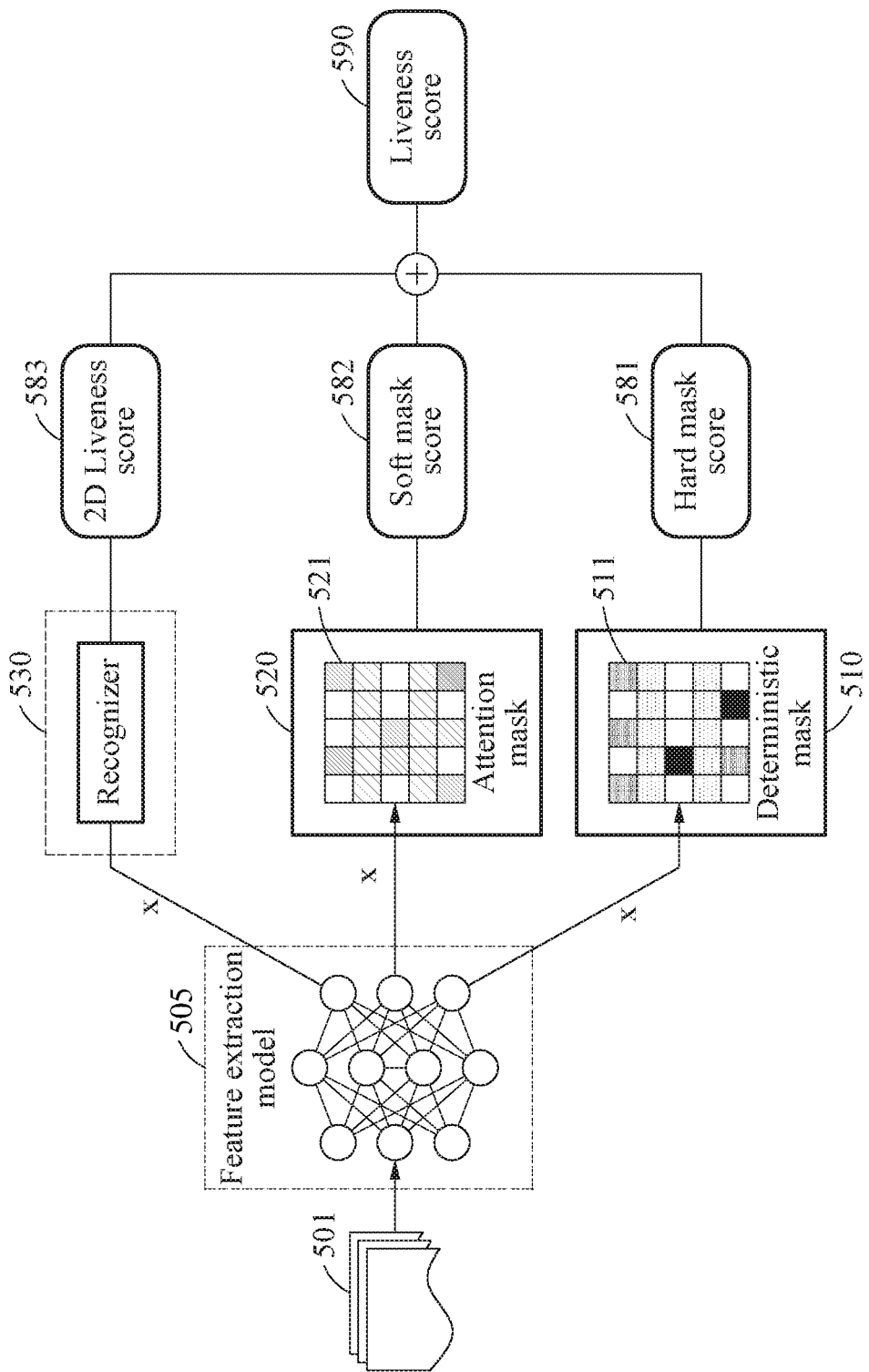
FIGS. 5 and 6 illustrate examples of a structure of a recognition model.
Figure 6:
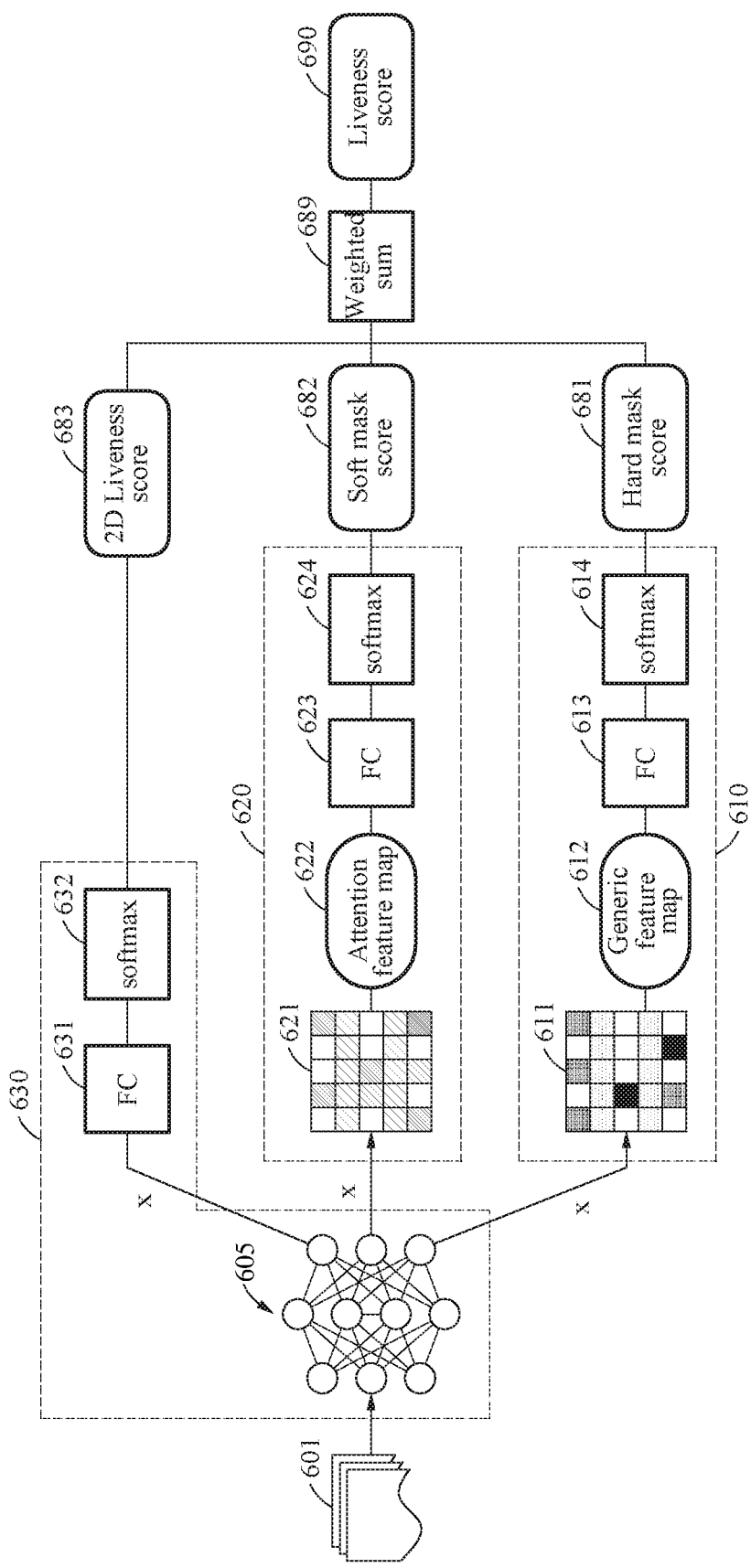

FIGS. 5 and 6 illustrate examples of a structure of a recognition model.

Referring to FIG. 5, an image recognition device may calculate recognition data based on a verification layer 530, in addition to recognition data based on a fixed mask 511 and a variable mask 521 as described with reference to FIGS. 3 and 4. The verification layer 530 includes a recognizer. First recognition data 581 based on a fixed layer 510 including the fixed mask 511 may also be referred to as "hard mask score." Second recognition data 582 based on a sensor-specific layer 520 including the variable mask 521 may also be referred to as "soft mask score." Third recognition data 583 based on a basic liveness verification model may also be referred to as "2D liveness score." The image recognition device may calculate the first recognition data 581, the second recognition data 582, and the third recognition data 583 individually from feature data x extracted in common from a single input image 501 through a feature extraction layer 505.

The image recognition device may determine a recognition result 590 further based on the third recognition data 583 in addition to the first recognition data 581 and the second recognition data 582. For example, the image recognition device may generate authenticity information indicating whether an object is a real object or a fake object, as the recognition result 590. The recognition result 590 is a liveness score and may include a value indicating a probability of being a real object.

FIG. 6 illustrates a structure corresponding to the structure of FIG. 5, in greater detail.

Referring to FIG. 6, a recognition model may include a fixed layer 610, a sensor-specific layer 620, and a liveness verification model 630. When implementing a recognition model using an input image 601, the image recognition device may propagate feature data x extracted by a feature extraction layer 605 of the liveness verification model 630 to the fixed layer 610 and the sensor-specific layer.

The fixed layer 610 may include a fixed mask 611, a fully connected layer 613, and a softmax operation 614. For example, the image recognition device may apply the fixed mask 611 to the feature data x, thereby calculating a generic feature map 612, $Feat_{generic}$ as shown in Equation 2 below.

$$Feat_{generic} = M_{hard} \odot x \quad \text{[Equation 2]}$$

In Equation 2, $Feat_{generic}$ is the generic feature map 612, $M_{hard}$ is the fixed mask 611, x is feature data, and ⊙ is an element-wise operation, for example, an element-wise multiplication. The image recognition device may calculate first recognition data 681 by applying the softmax operation 614 to a value that is output by propagating the generic feature map 612 $Feat_{generic}$ to the fully connected layer 613. For example, the feature data x, the generic feature map 612 $Feat_{generic}$, and the fully connected layer 613 output data of the same size (e.g., 32×32).

The sensor-specific layer 620 may include an attention layer 621, a fully connected layer 623, and a softmax operation 624. The attention layer 621 will be described in greater detail with reference to FIG. 7. For example, the image recognition device may calculate an attention feature map as a sensor-specific feature map 622 $Feat_{specific}$ from the feature data x using the attention layer 621.

$$Feat_{specific} = M_{soft} \odot h(x) \quad \text{[Equation 3]}$$

In Equation 3, $Feat_{specific}$ is the sensor-specific feature map 622, $M_{soft}$ is a variable mask, and h(x) is a target feature map corresponding to the feature data x. Calculation of the target feature map h(x) will be described with reference to FIG. 7. The image recognition device may calculate second recognition data 682 by applying the softmax operation 624 to a value that is output by propagating the sensor-specific feature map 622 $Feat_{specific}$ to the fully connected layer 623. For example, the feature data x, the sensor-specific feature map 622 $Feat_{specific}$, and the fully connected layer 623 output data of the same size (e.g., 32×32).

The liveness verification model 630 may include the feature extraction layer 605 and a recognizer. The image recognition device calculates third recognition data 683 from the extracted feature data x using a fully connected layer 631 and a softmax operation 632. For example, the fully connected layers 613, 623, and 631 output data of the same size (e.g., 32×32).

The image recognition device calculates a liveness score 690 by applying a weighted sum operation 689 to the first recognition data 681, the second recognition data 682, and the third recognition data 683.

The image recognition device implements the liveness verification model 630, the fixed layer 610, and the sensor-specific layer 620 in parallel. For example, the image recognition device may propagate the feature data x extracted by the feature extraction layer 605 to the fixed layer 610, the sensor-specific layer 620, and the verification model 630 simultaneously or within short time. However, embodiments are not limited to the foregoing example, and the image recognition device may propagate the feature data x to the liveness verification model 630, the fixed layer 610, and the sensor-specific layer 620 in sequence. The first recognition data 681, the second recognition data 682, and the third recognition data 683 may be calculated simultaneously, but are not limited to being calculated simultaneously. The first recognition data 681, the second recognition data 682, and the third recognition data 683 may also be calculated at different times based on an operation time required in each of the fixed layer 610, the sensor-specific layer 620, and the liveness verification model 630.

Figure 7:
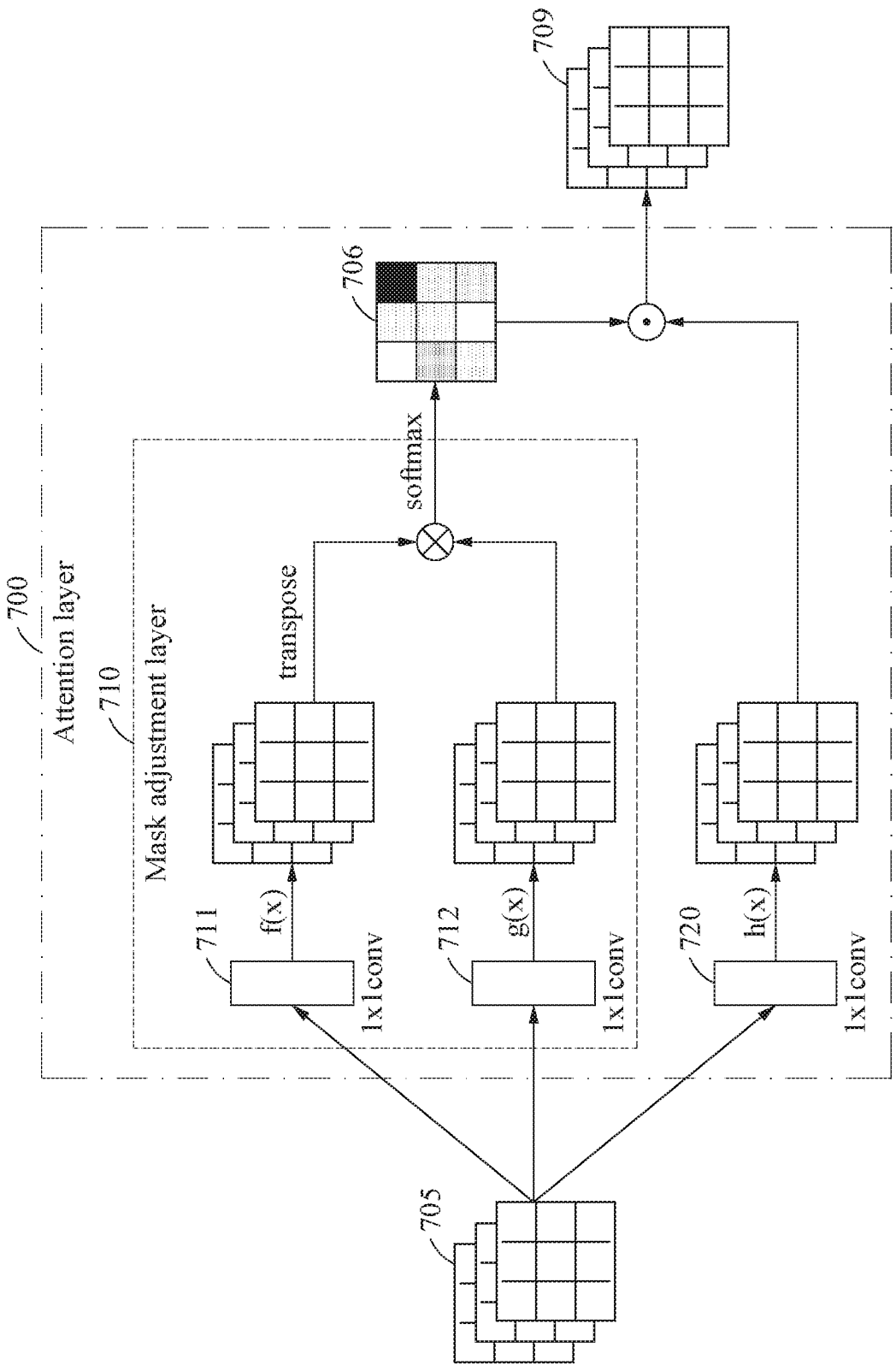
FIG. 7 illustrates an example of an attention layer.

FIG. 7 illustrates an example of an attention layer 700.

Referring to FIG. 7, am image recognition device may adjust one or more values of a variable mask 706 using an attention layer 700. The attention layer 700 may include a mask adjustment layer 710, a target extraction layer 720, and a masking operation. The mask adjustment layer 710 may include a query extraction layer 711 and a key extraction layer 712. The query extraction layer 711, the key extraction layer 712, and the target extraction layer 720 may each include one or more convolutional layers but are not limited to such a configuration.

The image recognition device may extract a query feature map f(x) from feature data 705 using the query extraction layer 711. The image recognition device may extract a key feature map g(x) from the feature data 705 using the key extraction layer 712. The image recognition device may extract a target feature map h(x) using the target extraction layer 720. As described with reference to FIG. 2, in an example in which an input image is a color image and includes a plurality of channel images, for example, images of three channels, the feature data 705 is extracted for each channel. The query extraction layer 711, the key extraction layer 712, and the target extraction layer 720 may be configured to extract a characteristic for each channel.

For example, the image recognition device may determine a value of the variable mask 706 using a softmax function from a result of multiplication between the transposed query feature map f(x) and the key feature map g(x) which is a result of applying convolution filtering to the feature data 705. The result of the multiplication between the key feature map g(x) and the transposed query feature map f(x) indicates levels of similarities between a given query and all keys. The variable mask 706 may be determined as shown in Equation 4 below.

$$M_{soft} = \text{softmax}(f(x)^T g(x)) \quad \text{[Equation 4]}$$

In Equation 4, $M_{soft}$ is the variable mask 706, f(x) is a query feature map, and g(x) is a key feature map. The image recognition device may apply the variable mask 706 $M_{soft}$ determined according to Equation 4 to the target feature map h(x) according to Equation 3. A sensor-specific feature map 709 indicates a result of masking the target feature map h(x) using the variable mask 706 $M_{soft}$. The sensor-specific feature map 709 is generated for each channel based on a number of channels.

The attention layer 700 may prevent a vanishing gradient problem by referencing the entire image of an encoder in a decoder for each point in time. The attention layer 700 may reference the entire image with focusing on a portion having a high correlation with recognition instead of the same value. Although FIG. 7 illustrates the attention layer as a self-attention structure that receives the same feature data as a query, a key, and a value, the disclosure is not limited to such an example.

Figure 8:
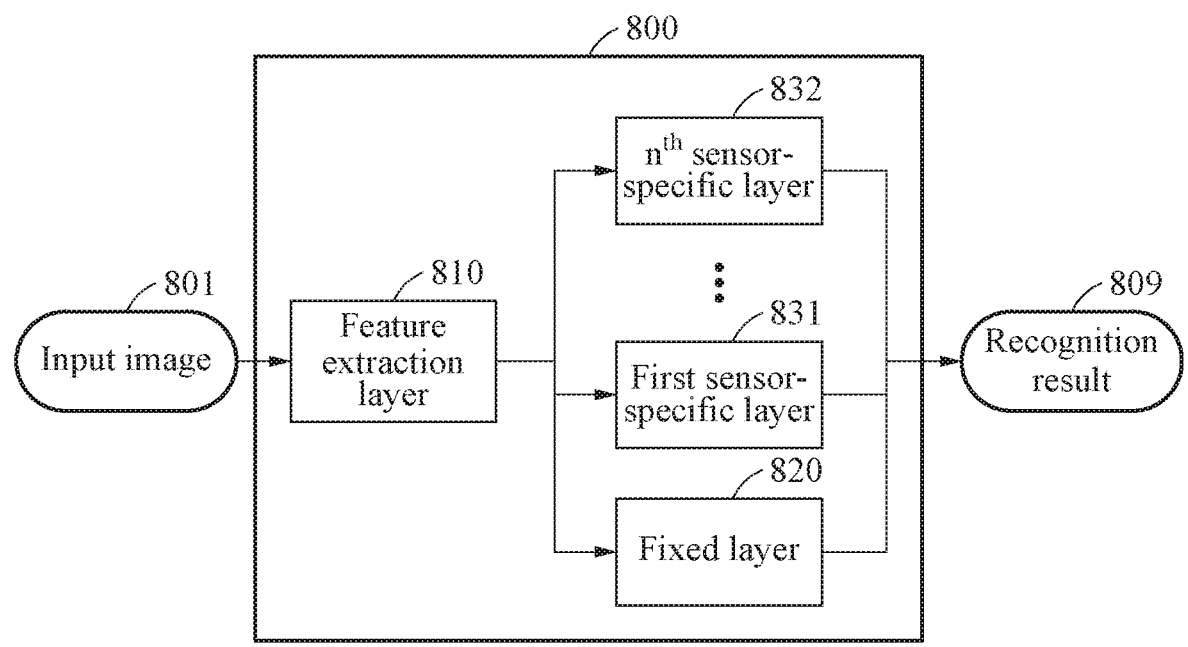
FIG. 8 illustrates an example of a structure of a recognition model.

FIG. 8 illustrates an example of a structure of a recognition model.

Referring to FIG. 8, a recognition model 800 may include a feature extraction layer 810, a fixed layer 820, and a first sensor-specific layer 831 to an $n^{th}$ sensor-specific layer 832, n being an integer greater than or equal to 2. The first sensor-specific layer 831 to the $n^{th}$ sensor-specific layer 832 may each include a variable mask. A value of the variable mask may be adjusted in response to feature data extracted from an input image 801 by the feature extraction layer 810. The image recognition device may calculate a recognition result 809 based on a fixed mask of the fixed layer 820 and a plurality of variable masks of a plurality of sensor-specific layers. The image recognition device may determine a recognition result 809 by aggregating recognition data calculated from the fixed layer 820 and the first sensor-specific layer 831 to the $n^{th}$ sensor-specific layer 832. For example, the image recognition device may determine a weighted sum of a plurality of items of recognition data to be the recognition result 809.

A parameter of a sensor-specific layer including a variable mask among the plurality of variable masks may be different from a parameter of another sensor-specific layer including another variable mask among the plurality of variable masks. Also, the first sensor-specific layer 831 to the $n^{th}$ sensor-specific layer 832 may be layers having different structures. For example, one sensor-specific layer among the first sensor-specific layer 831 through the $n^{th}$ sensor-specific layer 832 may be implemented as an attention layer and remaining sensor-specific layers among the first sensor-specific layer 831 through the $n^{th}$ sensor-specific layer 832 may be implemented in structures different than the attention layer.

Figure 9:
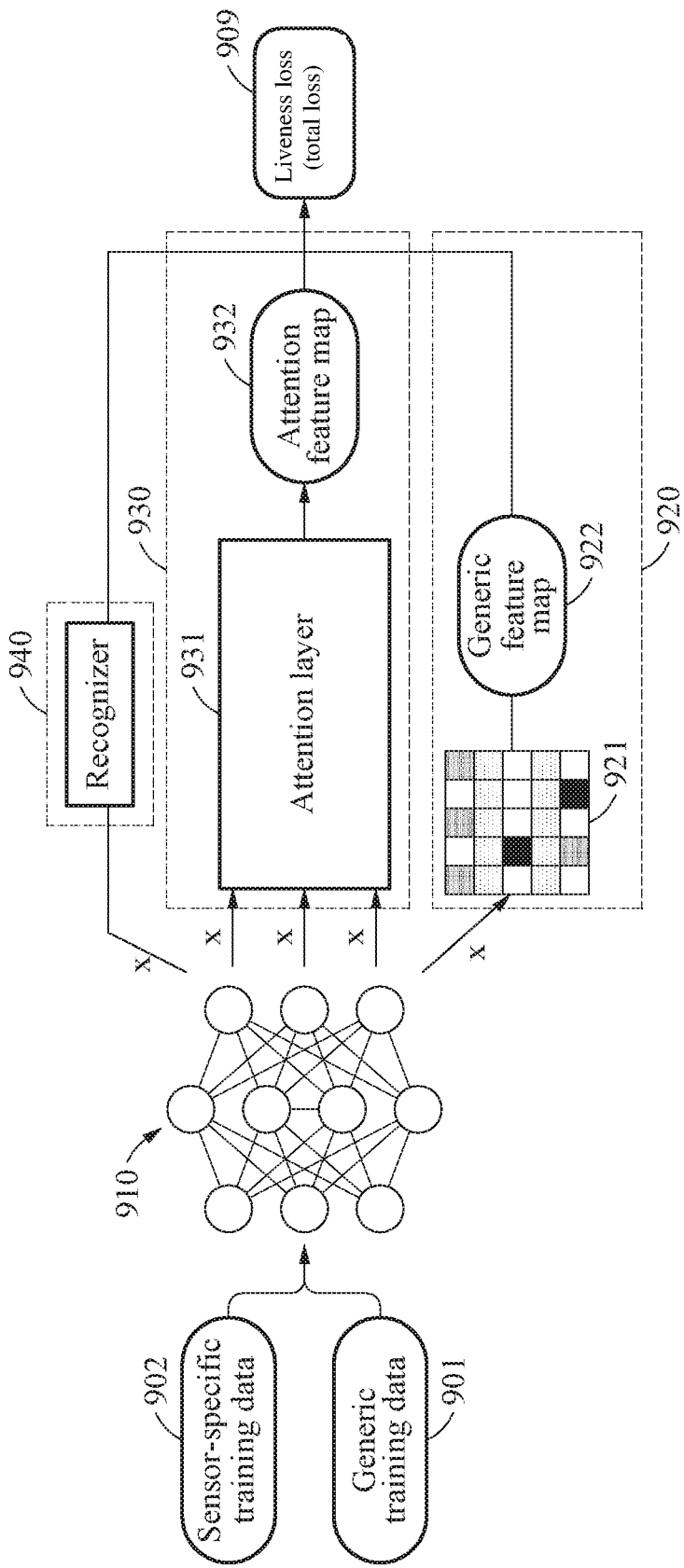
FIG. 9 illustrates an example of training a recognition model.

FIG. 9 illustrates an example of training a recognition model.

Referring to FIG. 9, a training device may train a recognition model using training data. The training data may include a pair of data including a training input and a training output. The training input is, for example, an image. The training output is, for example, a ground truth of recognition of an object appearing in the corresponding image. The training output may have a value (e.g., 1) indicating that an object appearing in a training input image is a real object or a value (e.g., 0) indicating that the object is a fake object. After training, the trained recognition model outputs a value of a real number between 0 and 1 as recognition data. The value may indicate a probability that the object appearing in the input image is a real object. However, the disclosure is not limited to the example described above.

The training device may calculate a temporary output by propagating the training input to a temporary recognition model. A recognition model on which the training is not completed yet may be referred to as "temporary recognition model." The training device may calculate feature data using a feature extraction layer 910 of the temporary recognition model and may propagate the feature data to a fixed layer 920, a sensor-specific layer 930, and a verification layer 940. In a process of propagation, a temporary generic feature map 922 and a temporary attention feature map 932 may be calculated. The training device may calculate a first temporary output from the fixed layer 920, calculate a second temporary output from the sensor-specific layer 930, and calculate a third temporary output from the verification layer 940. The training device may calculate a loss from each of the temporary output and the training output based on a loss function. For example, the training device calculates a first loss based on the first temporary output and the training output, calculates a second loss based on the second temporary output and the training output, and calculates a third loss based on the third temporary output and the training output.

$$\text{Liveness loss} = \alpha \cdot \text{Loss}_1 + \beta \cdot \text{Loss}_2 + \gamma \cdot \text{Loss}_3 \quad \text{[Equation 5]}$$

The training device calculates a weighted loss of the calculated losses as shown in Equation 5 above. In Equation 5, Liveness loss is a total loss 909, $\text{Loss}_1$ is the first loss, $\text{Loss}_2$ is the second loss, and $\text{Loss}_3$ is the third loss. $\alpha$ is a weight for the first loss, $\beta$ is a weight for the second loss, and $\gamma$ is a weight for the third loss. The training device may update a parameter of the temporary recognition model until the total loss 909 reaches a threshold loss. Depending on a design of the loss function, the training device may increase or reduce the total loss 909. For example, the training device updates the parameter of the temporary recognition model through backpropagation.

The training device may update all parameters of the feature extraction layer 910, the fixed layer 920, the sensor-specific layer 930, and the verification layer 940 for an untrained initial recognition model during the training. In this example, the training device may train the initial recognition model using generic training data 901. The generic training data 901 includes, for example, an image acquired by an image sensor as a training input. A training image of the generic training data 901 may be acquired by an image sensor of one type, but may also be acquired by image sensors of various types. A recognition model trained using the generic training data 901 may also be referred to as "generic recognition model." The generic recognition model may be, for example, a model mounted on a flagship-level electronic terminal having a high-end performance. An image sensor of the flagship-level electronic terminal may have a relatively high optical performance. In some cases, an optical characteristic of a specific type of image sensor is not reflected in the generic recognition model. In such cases, the generic recognition model may output a false rejection (FR) result and a false acceptance (FA) result for the corresponding type of image sensor. The FR result indicates a result of misidentifying true to be false. The FA result indicates a result of misidentifying false to be true.

The training device may generate a recognition model for a specific type of image sensor from the generic recognition model. For example, during the training, the training device may fix values of a fixed mask 921 included in the fixed layer 920 and a parameter of the verification layer 940 in the generic recognition model. The training device may update a parameter of the sensor-specific layer 930 in the temporary recognition model during the training. As described above, the training device may calculate the total loss 909 and adjust the parameter of the sensor-specific layer 930 repetitively until the total loss 909 reaches a threshold loss. For example, the training device updates a parameter (e.g., a connection weight) of an attention layer 931 and a parameter of a fully connected layer in the sensor-specific layer 930.

In this example, the training device uses the generic training data 901 and sensor-specific training data 902 together to train the sensor-specific layer 930 of the recognition model. The sensor-specific training data 902 is data including only training images acquired by the specific type of image sensor. As described above, types of image sensors are classified based on optical characteristics of the image sensors. The training device may use the sensor-specific training data 902 to update the parameter of the sensor-specific layer 930 based on a loss calculated in a manner similar to that set forth in the above description.

At an early stage of releasing a new product, a quantity of the sensor-specific training data 902 may not be sufficient. To prevent over-fitting occurring due to the insufficiency of the training data, the training device may use the generic training data 901 for training. A quantity of the generic training data 901 may be greater than a quantity of the sensor-specific training data 902. For example, the training device may generate a recognition model having the sensor-specific layer 930 specialized in individual optical characteristics using the generic training data 901 (e.g., a database including millions of pieces of image data) in addition to a small quantity (e.g., tens of thousands of pieces) of the sensor-specific training data 902. Through this, the training device may generate the recognition model specialized in the specific type of image sensor from the generic recognition model within a relatively short period of time. In a case in which a previously unseen spoofing attack occurs, the training device may learn the parameter of the sensor-specific layer and urgently distribute the parameter of the trained sensor-specific layer to an image recognition device (e.g., an electronic terminal of FIG. 10) so as to quickly defend against the spoofing attack. The sensor-specific training data 902 may include, for example, images corresponding to newly reported FR results and FA results.

Figure 10:
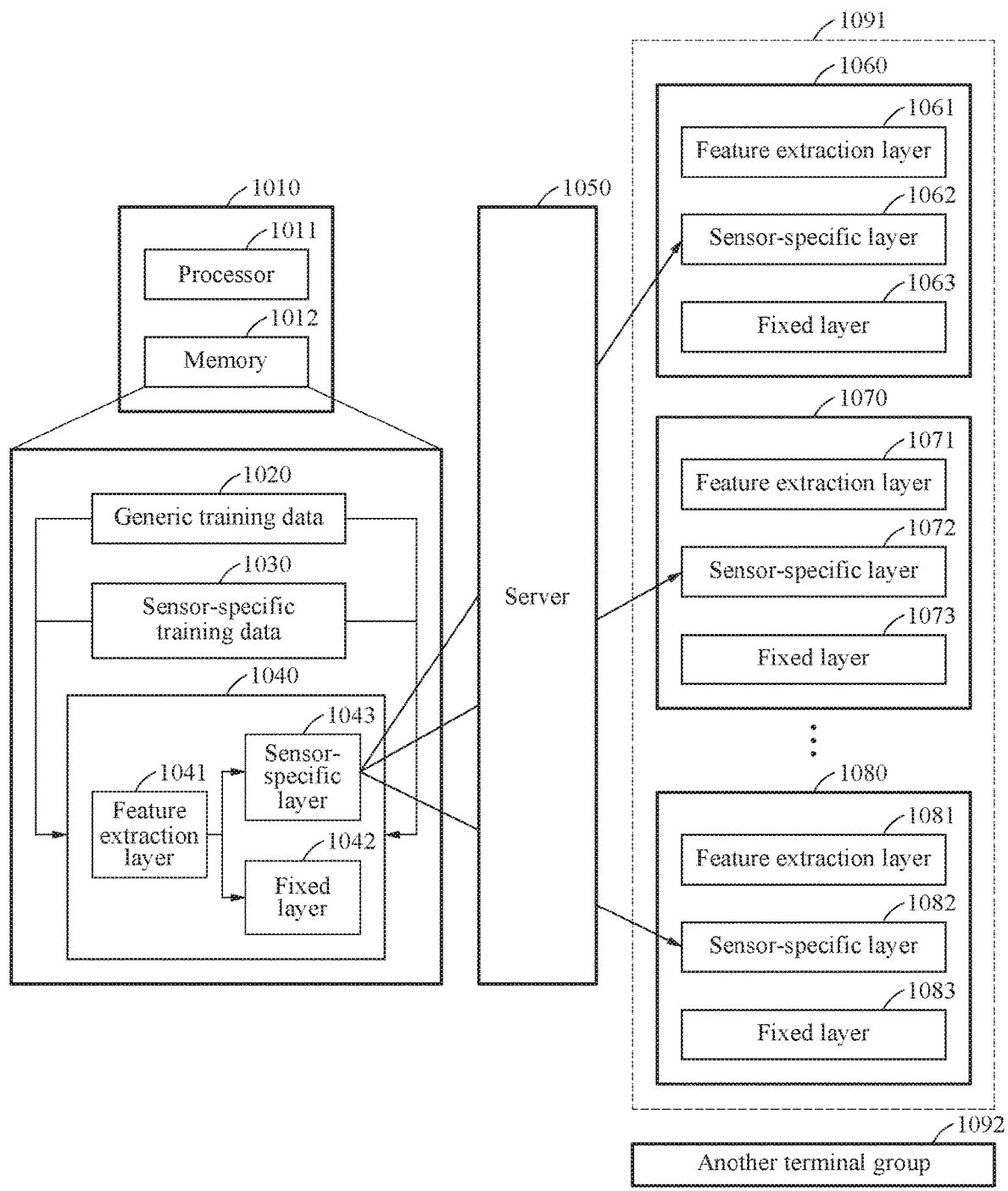
FIG. 10 illustrates an example of a parameter update of a sensor-specific layer in a recognition model.

FIG. 10 illustrates an example of a parameter update of a sensor-specific layer in a recognition model.

Referring to FIG. 10, an image recognition system may include a training device 1010, a server 1050, and electronic terminals 1060, 1070, and 1080.

A processor 1011 of the training device 1010 may train a recognition model as described with reference to FIG. 9. The training device 1010 may perform additional training on a sensor-specific layer 1043 of a recognition model 1040 even after initial training of the initial recognition model 1040 is completed. For example, in response to a case in which a new spoofing attack occurs, the training device 1010 may retrain the sensor-specific layer 1043 of the recognition model 1040 based on training data associated with the new spoofing attack.

A memory 1012 of the training device 1010 may store the recognition model 1040 before and after the training of the recognition model is completed. Also, the memory 1012 may store generic training data 1020, sensor-specific training data 1030, and parameters of a feature extraction layer 1041, the sensor-specific layer 1043, and a fixed layer 1042 of the recognition model 1040. When the training of FIG. 9 is completed, the training device 1010 may distribute the trained recognition model 1040 through communication (e.g., wired communication or wireless communication) with the server 1050.

The server 1050 may distribute a portion of parameters of the recognition model 1040 to each electronic terminal instead of all of the parameters. For example, in response to a case in which additional training of the sensor-specific layer 1043 of the recognition model 1040 is completed, the training device 1010 upload a parameter of the retrained sensor-specific layer 1043 to the server 1050. The server 1050 may provide only the parameter of the sensor-specific layer 1043 to the electronic terminals 1060, 1070, and 1080 of an electronic terminal group 1091 having a specific type of image sensors. The electronic terminals 1060, 1070, and 1080 included in the electronic terminal group 1091 are, for example, equipped with image sensors having identical or similar optical characteristics. In response to at least one of an update request received from an electronic terminal among the electronic terminals 1060, 1070, and 1080 or completion of additional training for the sensor-specific layer 1043 of a recognition model 1050, the server 1050 may distribute the additionally trained sensor-specific layer 1043 to the corresponding electronic terminal(s) 1060, 1070, and/or 1080. The update request may be a signal of a terminal requesting a server to update the recognition model.

Although FIG. 10 illustrates that the training device 1010 stores the recognition model 1040 of one type, the disclosure is not limited to this example. The training device may store other types of recognition models and provide an updated parameter to another terminal group 1092.

Each of the electronic terminals 1060, 1070, and 1080 included in the electronic terminal group 1091 may receive a parameter of the sensor-specific layer 1043 including a variable mask from the external server 1050 in response to an update command. The update command may be based on a user input, and may also be a command received by an electronic terminal from a server. The electronic terminals 1060, 1070, and 1080 respectively update sensor-specific layers 1062, 1072, and 1082 with the received parameters. In this example, the electronic terminals 1060, 1070, and 1080 may fix parameters of fixed layers 1063, 1073, and 1083 and remaining feature extraction layers 1061, 1071, and 1081. For example, the electronic terminals 1060, 1070, and 1080 may maintain values of fixed masks before, during, and after updating the parameters of the sensor-specific layers 1062, 1072, and 1082. For example, in a case in which an FR result and an FA result dependent on a unique optical characteristic of an individual image sensor are reported, the training device distributes a parameter obtained as a result of training the sensor-specific layer 1043 on the FR result and the FA result.

The electronic terminal may request, from the external server 1050, a sensor-specific parameter 1043 corresponding to an optical characteristic identical or similar to an optical characteristic of a currently mounted image sensor. The server 1050 may retrieve the sensor-specific parameter 1043 corresponding to the optical characteristic requested from the electronic terminal and provide the retrieved sensor-specific parameter 1043 to the corresponding electronic terminal.

Although FIG. 10 illustrates that the server 1050 distributes the parameter of the sensor-specific layer 1043 as an example, the disclosure is not limited to this example. In a case in which the value of the fixed mask of the fixed layer 1042 is changed, the server 1050 may distribute the values to the electronic terminals 1060, 1070, and 1080. The electronic terminals 1060, 1070, and 1080 may update the fixed layers 1063, 1073, and 1083 as necessary. For example, in a case in which general FR results and FA results irrelevant to unique optical characteristics of individual image sensors are reported, the training device may adjust the value of the fixed mask of the fixed layer 1042. For reference, the updating of the fixed mask may improve a recognition performance in various electronic terminals including image sensors of various types for general purpose. The updating of the variable mask corresponding to the individual optical characteristic may improve a recognition performance in an electronic terminal including an image sensor having a corresponding optical characteristic.

If a neural network is trained on data acquired using a specific device, the corresponding device may have a high recognition rate. However, when the same neural network is installed in another device, the recognition rate may be reduced. As described with reference to FIGS. 9 and 10, the recognition model may have a sensor-specific layer specialized for each type of image sensor through a few additional trainings instead of retraining the entire network. As such, since an emergency patch for the recognition model is possible, the privacy and security of the electronic terminals 1060, 1070, and 1080 may be more strongly protected.

Figure 11:
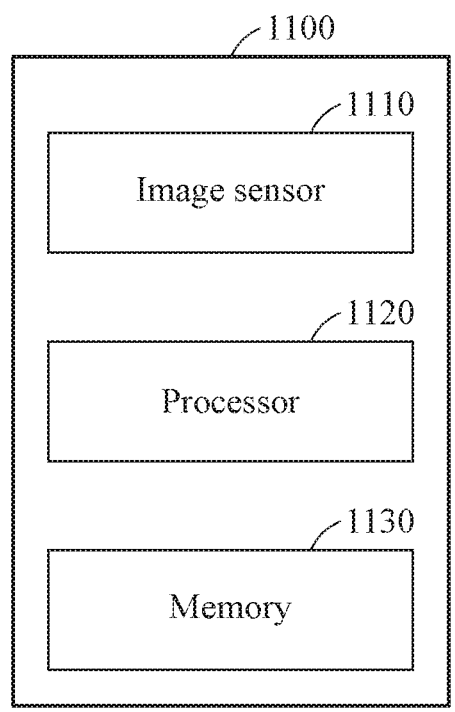
FIGS. 11 and 12 are block diagrams illustrating examples of an image recognition device.
Figure 12:
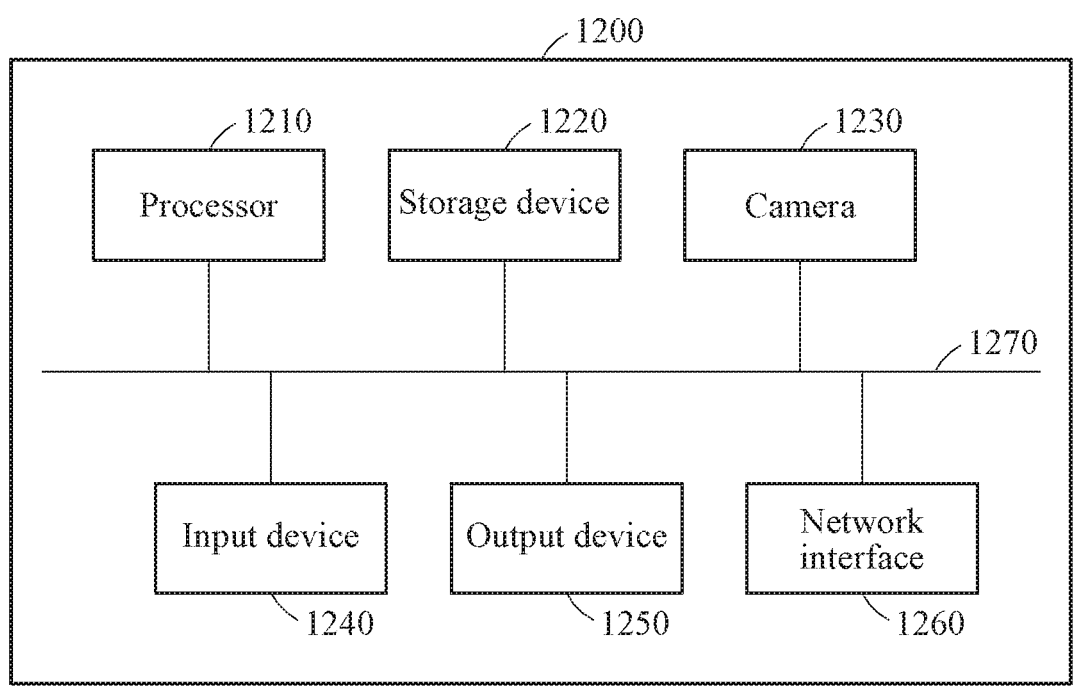

FIGS. 11 and 12 are block diagrams illustrating examples of an image recognition device.

Referring to FIG. 11, an image recognition device 1100 includes, for example, an image sensor 1110, a processor 1120, and a memory 1130.

The image sensor 1110 may receive an input image. The image sensor 1110 may be, for example, a camera sensor that captures a color image. Also, the image sensor 1110 may be a dual-phase detection (2PD) sensor that acquires a disparity image for one pixel using a difference between left and right phases. Since the disparity image is directly generated by the 2PD sensor, a depth image may be calculated from the disparity image without using a stereo sensor and a typical depth extraction technique.

Unlike depth sensors of a time-of-flight (ToF) type and a structured light type, the 2PD sensor is mounted to the image recognition device 1100 without a use of an additional form factor and a sensor cost. For example, unlike a contact image sensor (CIS), the 2PD sensor includes sensing elements, each including two photodiodes (e.g., a first photodiode and a second photodiode). Accordingly, through capturing of the 2PD sensor, two images are generated. The two images include an image sensed by the first photodiode (e.g., a left photodiode) and an image sensed by the second photodiode (e.g., a right photodiode). The two images slightly differ due to a physical distance between the photodiodes. The image recognition device 1100 may calculate a disparity due to a difference in distance using the two images based on triangulation and the like, and estimates a depth for each pixel from the calculated disparity. Unlike the CIS that outputs three channels, the 2PD sensor outputs one channel image for each of the two photodiodes, thereby reducing a memory usage and an operation quantity. This is because one pair of channel images (e.g., total two channels) is required to estimate a disparity from an image acquired by 2PD sensor, whereas three pairs of channel images (e.g., total six channels) are required to estimate a disparity from an image acquired by the CIS.

However, the foregoing description is merely an example, and the image sensor 1110 may include an infrared sensor, a radar sensor, an ultrasonic sensor, a depth sensor, or the like.

The processor 1120 may extract feature data from an input image using a feature extraction layer. The processor 1120 may output a recognition result of an object appearing in the input image from the extracted feature data based on a fixed mask and a variable mask adjusted in response to the extracted feature data. When a parameter of a sensor-specific layer is received from a server through communication, the processor 1120 may update a parameter of the sensor-specific layer stored in the memory 1130.

The memory 1130 may temporarily or permanently store a recognition model and data generated in a process of implementing the recognition model. When a new parameter of the sensor-specific layer is received from the server, the memory 1130 may replace an existing parameter with the received new parameter.

Referring to FIG. 12, a computing device 1200 may be a device for recognizing an image using the image recognition method described herein. In an example, the computing device 1200 may correspond to the electronic terminal of FIG. 10 and/or the image recognition device 1100 of FIG. 11. The computing device 1200 may be, for example, an image processing device, a smartphone, a wearable device, a tablet computer, a netbook, a laptop, a desktop, a personal digital assistant (PDA), an HMD, or the like.

Referring to FIG. 12, the computing device 1200 includes, for example a processor 1210, a storage device 1220, a camera 1230, an input device 1240, an output device 1250, and a network interface 1260. The processor 1210, the storage device 1220, the camera 1230, the input device 1240, the output device 1250, and the network interface 1260 may communicate with one another through a communication bus 1270.

The processor 1210 executes functions and instructions in the computing device 1200. For example, the processor 1210 processes instructions stored in the storage device 1220. The processor 1210 may perform one or more operations described above with reference to FIGS. 1 through 11.

The storage device 1220 stores information and data needed for execution of the processor 1210. The storage device 1220 may include a computer-readable storage medium or computer-readable storage device. The storage device 1220 stores instructions to be executed by the processor 1210, and stores related information while software or an application is being executed by the computing device 1200.

The camera 1230 captures an input image for each image recognition. The camera 1230 may capture a plurality of images, for example, a plurality of frame images. The processor 1210 may output a recognition result of a single image using the aforementioned recognition model.

The input device 1240 may receive an input from a user through a tactile, video, audio, or touch input. The input device 1240 may include, for example, a keyboard, a mouse, a touchscreen, a microphone, and/or other devices that may detect an input from a user and transmit the detected input. The output device 1250 may provide an output of the computing device 1200 to a user through a visual, auditory, or tactile channel. The output device 1250 may include, for example, a display, a touchscreen, a speaker, a vibration generator, and/or other devices that may provide an output to a user. The network interface 1260 may communicate with an external device through a wired or wireless network. The output device 1250 provides a recognition result of input data (e.g., access granted and/or access denied) to a user using any one or any combination of any two or more of visual information, auditory information, and haptic information.

The computing device 1200 may give an authority based on the recognition result. The computing device 1200 may allow an access to at least one of an operation and data of the computing device 1200 based on the authority. As an example, the computing device 1200 may give the authority in response to a case in which it is verified from the recognition result that a user is a registered user in the computing device 1200 and is a real object. When the computing device 1200 is locked, the computing device 1200 may be unlocked based on the authority. As another example, the computing device 1200 may allow an access to a financial payment function in response to a case in which it is verified from the recognition result that a user is a registered user in the computing device 1200 and is areal object. As another example, after the recognition result is generated, the computing device 1200 visualizes the recognition result through the output device 1250, for example, a display.

The neural network 100, the recognition models 310, 400, 800, and 1040, the processors 1011, 1120, and 1210, the memories 1012 and 1130, the server 1050, the storage device 1220, the input device 1240, the output device 1250, the network interface 1260 the neural networks, the recognition models, the processors, the memories, and other apparatuses, devices, units, modules, and components in FIGS. 1 to 12 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-12 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method with image recognition, comprising:
    extracting, using a feature extraction layer, feature data from an input image received by an image sensor; and
    outputting a recognition result of an object appearing in the input image, by applying a fixed mask and a variable mask to the extracted feature data,
    wherein the variable mask is adjusted in response to the extracted feature data, and
    wherein the outputting of the recognition result comprises:
        adjusting one or more values of the variable mask based on the extracted feature data, using at least a portion of a sensor-specific layer including the variable mask.

2. The method of claim 1, wherein the outputting of the recognition result comprises:
    calculating first recognition data from the extracted feature data, by the applying of the fixed mask to the extracted feature data;
    calculating second recognition data from the extracted feature data, by the applying of the variable mask to the extracted feature data; and
    determining the recognition result based on the first recognition data and the second recognition data.

3. The method of claim 2, wherein the calculating of the first recognition data comprises:
    generating a generic feature map related to an object region of interest by the applying of the fixed mask to the extracted feature data; and
    calculating the first recognition data from the generic feature map.

4. The method of claim 2, wherein the calculating of the second recognition data comprises:
    generating a sensor-specific feature map related to a region of interest of the image sensor by the applying of the variable mask to a target feature map corresponding to the extracted feature data; and
    calculating the second recognition data from the sensor-specific feature map.

5. The method of claim 4, wherein the generating of the sensor-specific feature map comprises:
    applying a corresponding value in the variable mask for an individual value of the target feature map.

6. The method of claim 2, further comprising:
    calculating, from the extracted feature data, third recognition data using a softmax function and a fully connected layer,
    wherein the determining of the recognition result comprises:
        determining the recognition result further based on the third recognition data in addition to the first recognition data and the second recognition data.

7. The method of claim 1, wherein the adjusting of the one or more values of the variable mask comprises:
    determining a value of the variable mask using a softmax function from a result of multiplication between a transposed query feature map and a key feature map corresponding to a result of applying convolutional filtering to the extracted feature data.

8. The method of claim 1, wherein the outputting of the recognition result comprises:
    determining, to be the recognition result, a weighted sum of first recognition data based on the fixed mask and second recognition data based on the variable mask.

9. The method of claim 8, wherein the determining of the weighted sum to be the recognition result comprises:
    applying, to the second recognition data, a weight greater than a weight applied to the first recognition data.

10. The method of claim 1, wherein the outputting of the recognition result comprises:
    calculating the recognition result based on the fixed mask and a plurality of variable masks.

11. The method of claim 10, wherein a parameter of a sensor-specific layer including one variable mask among the plurality of variable masks is different from a parameter of another sensor-specific layer including another variable mask among the plurality of variable masks.

12. The method of claim 1, wherein the outputting of the recognition result comprises:
    visualizing the recognition result on a display after the recognition result is generated.

13. A non-transitory computer-readable storage medium storing instructions that, when executed by a processor, cause the processor to perform the method of claim 1.

14. The method of claim 1, further comprising:
receiving, from an external server, in response to an update command, a parameter of the sensor-specific layer including the variable mask; and
updating the sensor-specific layer with the received parameter.

15. The method of claim 14, further comprising:
requesting, from the external server, a sensor-specific parameter corresponding to an optical characteristic similar or identical to an optical characteristic of the image sensor.

16. The method of claim 14, further comprising:
maintaining a value of the fixed mask while a parameter of the sensor-specific layer is updated.

17. The method of claim 1, wherein the outputting of the recognition result comprises:
generating, as the recognition result, authenticity information indicating whether the object is a real object or a fake object.

18. The method of claim 1, further comprising:
granting an authority based on the recognition result; and
allowing an access to either one or both of an operation of an electronic terminal and data of the electronic terminal, based on the authority.

19. A method with image recognition, comprising:
extracting, using a feature extraction layer, feature data from an input image received by an image sensor;
outputting a recognition result of an object appearing in the input image, by applying a fixed mask and a variable mask to the extracted feature data, wherein the variable mask is adjusted in response to the extracted feature data
receiving, from an external server, in response to an update command, a parameter of a sensor-specific layer including the variable mask; and
updating a sensor-specific layer with the received parameter.

20. The method of claim 19, further comprising:
requesting, from the external server, a sensor-specific parameter corresponding to an optical characteristic similar or identical to an optical characteristic of the image sensor.

21. The method of claim 19, further comprising:
maintaining a value of the fixed mask while a parameter of the sensor-specific layer is updated.

22. A method with image recognition, comprising:
extracting, using a feature extraction layer, feature data from an input image received by an image sensor; and
outputting a recognition result of an object appearing in the input image, by applying a fixed mask and a variable mask to the extracted feature data,
wherein the variable mask is adjusted in response to the extracted feature data, and
wherein the outputting of the recognition result comprises:
generating, as the recognition result, authenticity information indicating whether the object is a real object or a fake object.

23. A method with image recognition, comprising:
extracting, using a feature extraction layer, feature data from an input image received by an image sensor;
outputting a recognition result of an object appearing in the input image, by applying a fixed mask and a variable mask to the extracted feature data, wherein the variable mask is adjusted in response to the extracted feature data
granting an authority based on the recognition result; and
allowing an access to either one or both of an operation of an electronic terminal and data of the electronic terminal, based on the authority.

24. A device with image recognition, comprising:
an image sensor configured to receive an input image; and
a processor configured to:
extract feature data from the input image using a feature extraction layer; and
output a recognition result of an object appearing in the input image, by applying a fixed mask and a variable mask to the extracted feature data,
wherein the variable mask is adjusted in response to the extracted feature data, and
wherein, for the outputting of the recognition result, the processor is configured to adjust one or more values of the variable mask based on the extracted feature data, using at least a portion of a sensor-specific layer including the variable mask.

25. The device of claim 24, wherein the outputting of the recognition result comprises:
calculating first recognition data from the extracted feature data, by the applying of the fixed mask to the extracted feature data;
calculating second recognition data from the extracted feature data, by the applying of the variable mask to the extracted feature data; and
determining the recognition result based on a sum of the first recognition data and the second recognition data.

26. The device of claim 25, wherein the sum is determined by applying a weight to the second recognition data that is greater than a weight applied to the first recognition data.

27. The device of claim 25, wherein the calculating of the first recognition data comprises:
generating a generic feature map related to an object region of interest by the applying of the fixed mask to the extracted feature data; and
calculating the first recognition data from the generic feature map, and
wherein the calculating of the second recognition data comprises:
generating a sensor-specific feature map related to a region of interest of the image sensor by the applying of the variable mask to a target feature map corresponding to the extracted feature data; and
calculating the second recognition data from the sensor-specific feature map.

28. A system with image recognition, comprising:
an image recognition device configured to:
extract feature data from a received input image using a feature extraction layer; and
output a recognition result of an object appearing in the input image, by applying a fixed mask and a variable mask to the extracted feature data,
wherein the variable mask is included in a sensor-specific layer of the image recognition device, and is adjusted in response to the extracted feature data; and
a server configured to distribute a parameter of an additionally trained sensor-specific layer to the image recognition device, in response to either one or both of an update request from the image recognition device and completion of additional training for a sensor-specific layer of a recognition model of the server, wherein the image recognition device is configured to update the sensor-specific layer of the image recognition device based on the distributed parameter.

29. The system of claim 28, wherein the server is further configured to distribute the parameter of the additionally trained sensor-specific layer to another image recognition device comprising an image sensor determined to be similar to an image sensor of the image recognition device.

* * * * *